April 7, 1970     E. E. HULSEY     3,504,885
SEAT AND SEAL ASSEMBLY FOR VALVES
Filed Aug. 12, 1968     3 Sheets-Sheet 1
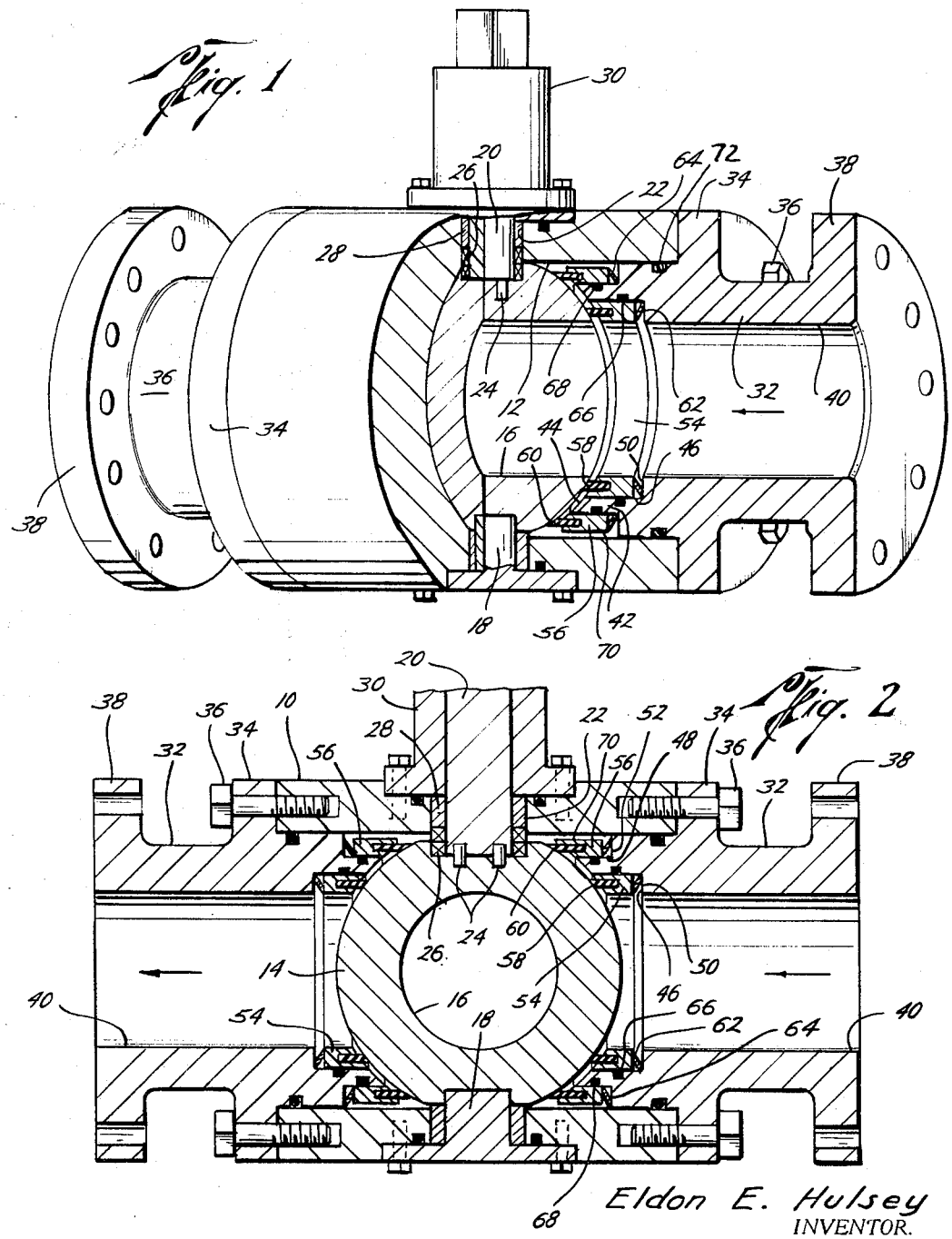
Eldon E. Hulsey
INVENTOR.
BY
ATTORNEY April 7, 1970 E. E. HULSEY 3,504,885
SEAT AND SEAL ASSEMBLY FOR VALVES
Filed Aug. 12, 1968 3 Sheets-Sheet 2

Eldon E. Hulsey
INVENTOR.

BY

ATTORNEY

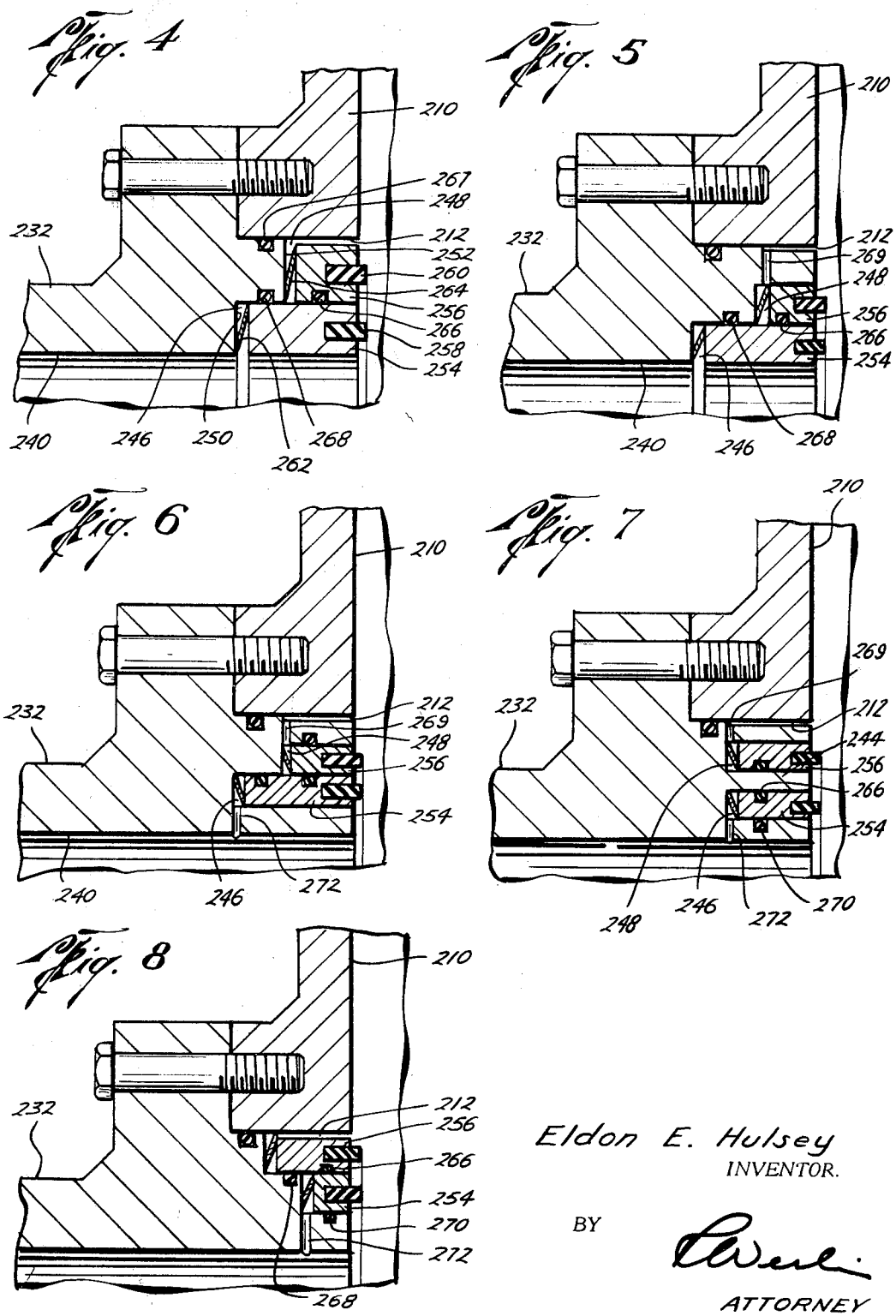

United States Patent Office 3,504,885
Patented Apr. 7, 1970

3,504,885
SEAT AND SEAL ASSEMBLY FOR VALVES
Eldon E. Hulsey, 5747 Warm Springs,
Houston, Tex. 77035
Filed Aug. 12, 1968, Ser. No. 751,837
Int. Cl. F16k 5/20, 3/20
U.S. Cl. 251—172
8 Claims

ABSTRACT OF THE DISCLOSURE

A seat and seal assembly for sealing one or both sides of gate- and ball-type valves. The assembly includes a pair of concentric seal rings slidably mounted in a seat face for independent axial movement relative to the opposed sealing surface of a valve closure member. Slidable sealing is provided between the rings and separate resilient means normally biases the rings toward the closure member. Passage means are provided in the seat for separately directing line pressure and valve body pressure against the respective rings to urge them toward the closure member, in accordance with the pressure differentials existing in each area.

---

Large diameter gate-type or ball-type valves are now commonly used for high pressure services of all kinds, and particularly in the control of oil and gas lines in the various phases of the petroleum industry. By reason of the severe service encountered in this industry, erosion and corrosion leads to serious problems in maintaining the valves effectively sealed against leakage in use, while holding to a minimum the forces required in opening and closing the valves.

Present designs of sealing assemblies have proven relatively ineffective and in almost all instances require the provision of an auxiliary system for injecting a flowable sealant to the seating areas in order to close off leaks which frequently develop between the regular sealing surfaces of the seats and closure members. This adds to the cost and complexity of the valve without improving the effectiveness of the primary sealing structure.

Accordingly, it is a primary object of the present invention to provide a seat and seal assembly for valves of the kind mentioned which overcomes the deficiencies of existing designs such as noted previously; which provides multiple sealing of one or both sides of the valve; and in which, in accordance with one embodiment, leakage past one seal will activate a plurality of additional seals so as to maintain the fluid-tight character of the valve.

A further object is the provision of a seat and seal assembly providing multiple sealing of both sides of a valve while substantially reducing the force requirements for opening and closing the valve.

In accordance with one embodiment of this invention, the seat and seal assembly includes a tubular end member, which may be the inlet or outlet nozzle or fitting of a valve, and the inner end of which defines an annular seat face opposed to one side of a valve closure member. A pair of concentric seal rings are disposed in the seat face for independent axial movement relative to each other and to the opposed closure member. The rings are slidably sealed off from one another and are separately biased toward the closure member by resilient biasing means. Passage means are provided to separately direct line pressure behind the inner one of the seal rings and valve body pressure behind the outer one of the rings. With this arrangement, at least one of the seals will be actuated by the dominant pressure, whether it be the trapped valve body pressure or the line pressure on the same side of the valve.

By employing identical seat and seal assemblies on both sides of the valve, the preferred arrangement, a total of four seals will be provided whereby effective sealing will be assured on both sides of the valve when in the closed position, and leakage past one of the rings will have the effect of activating the other three seals to maintain both upstream and downstream sealing at all time.

Other and more specific objects and advantages of this invention will become more readily apparent when read in conjunction with the accompanying drawing which illustrates several useful embodiments in accordance with this invention.

In the drawing:

FIG. 1 is a perspective elevational view, partly in section, of a ball-type valve employing seat and seal assemblies in accordance with one embodiment of this invention;

FIG. 2 is a longitudinal, vertical, cross-sectional view of the valve shown in FIG. 1;

FIGS. 4 to 8, inclusive, are fragmentary sectional views illustrating several modifications of seat and seal assemblies in accordance with this invention.

Figure 3:
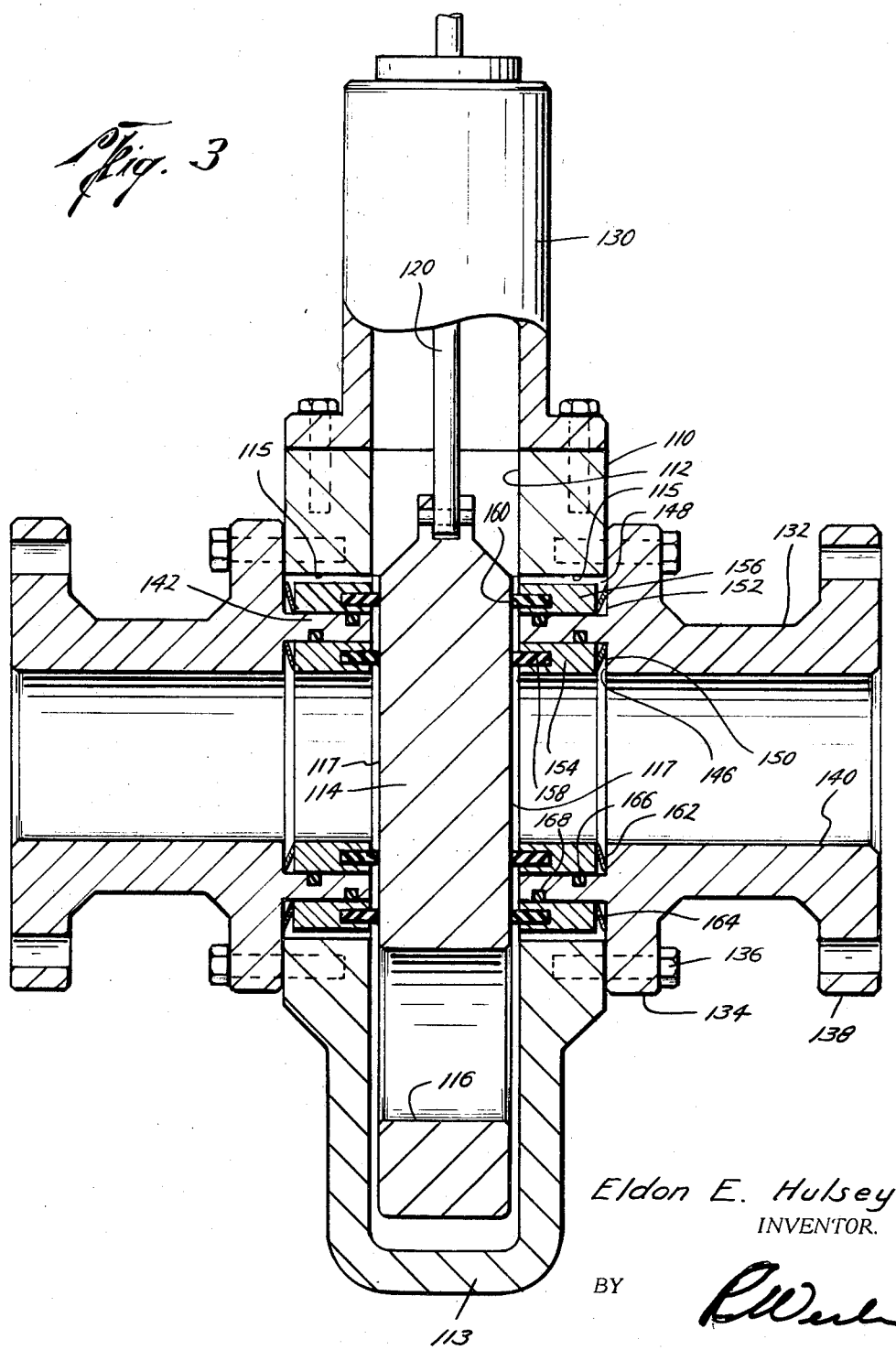
FIG. 3 is a longitudinal, vertical, cross-sectional view of a gate-type valve employing seat and seal assemblies in accordance with this invention.

Referring to the drawing, the valve illustrated in FIGS. 1 and 2 comprises a tubular body 10 having an axial bore 12 defining a closure chamber in which is disposed a ball-shaped closure member 14 which may be of any generally conventional design, having a diametrically extending through-bore 16. Closure member 14 is mounted for rotation on a lower trunnion 18 which is diametrically opposite an upper trunnion formed by the operating stem 20 which extends through a suitable opening 22 in body 10 and is keyed to the closure member 14 by dowel pins 24 for transmitting rotation of stem 20 to the closure member. Opening 22 forms a bearing box for receiving bearings 26 and 28 for the stem. The stuffing box is closed about stem 20 by a bonnet 30 which is bolted to the body.

Tubular nozzles or end fittings 32—32 extend slidably into the opposite ends of bore 12 and carry radially extending bolt flanges 34 which engage the ends of the body and are connectible thereto by means of cap screws 36. The outer ends of fittings 32 carry additional radially extending bolt flanges 38 for connecting the valve into a pipe line. It will be understood that the outer end connections on fittings 32 may be screw or other conventional connections instead of the bolt flanges illustrated.

Fittings 32 have axial bores 40 which are coaxial with bore 12 and through-bore 16 and of substantially the same diameter as the latter. Bores 12 and 40 define a flowway through the valve which is controlled by rotation of closure member 14 between open position, FIG. 1, where through-bore 16 is coaxial with bores 40 and closed position, FIG. 2, where closure member 14 has been rotated through an angle of 90° with respect to the axis of the flowway.

As both sides of the valve and seat and seal assemblies incorporated therein are identical in all respects, the further description will be limted to one side of the valve and will also, therefore, be equally applicable to the other side.

The inner end of fitting 32 is machined or otherwise cut away both interiorly and exteriorly to form the annular extension 42 which is substantially narrower than fitting 32. The forward end of extension 42 defines a seat face 44 which is machined to a spherical configuration conforming generally to the curvature of the opposed portion of the surface of the closure member 14. The reduction in thickness of fitting 32 to form extension 44 results in internal and external annular recesses 46 and 48, respectively, bottomed by respective annular shoulders 50 and 52 on opposite sides of extension 42. Slidably mounted in inner and outer recesses 46 and 48 are inner and outer seat rings 54 and 56, respectively, the forward ends of which have spherical configurations corresponding generally to that of closure member 14. The seat rings are provided with forwardly projecting sealing inserts 58 and 60, respectively, constructed of any suitable resilient material adapted to have tight sealing engagement with the opposed surface of closure member 14. Annular springs 62 and 64 are disposed in compression between the inner ends of the respective rings 54 and 56 and the related shoulders 50 and 52 to normally bias the rings and their respective sealing inserts outwardly of their respective recesses and toward the opposed surface of closure member 14.

An annular seal 66, such as a conventional O-ring, is sealingly disposed between inner seat ring 54 and the inner cylindrical surface of extension 42 and a similar annular seal 68 is sealingly disposed between outer seat ring 56 and the outer cylindrical surface of extension 42.

In the illustrative embodiment, seat rings 54 and 56 are shown as constructed of metallic material having the plastic or deformable sealing inserts 58 and 60 mounted therein, this being a generally conventional combination. However, the seat rings may be constructed as one piece bodies formed in their entirety from suitable plastic material, such as nylon, Teflon and the like, and having their forward ends shaped to sealingly engage the opposed surface of the closure member.

With the arrangement of the seat rings in the forward end of fitting 32 heretofore described, it will be noted that an annular clearance space 70 (greatly exaggerated for purposes of illustration) is provided between outer ring 56 and the wall of bore 12 which communicates at one end with the interior of body 10 and at the other end with the bottom of recess 48 behind the inner end of ring 56. The interior of recess 46 is in open communication with bore 40 and the flowway through the valve. With inserts 58 and 60 in sealing engagement with the surface of closure member 14 under the force of biasing springs 62 and 64, seal rings 66 and 68 will function to segregate recesses 46 and 48 from each other and the forces acting therein on the respective seat rings. Thus outer ring 56 will be exposed to the force of fluid pressure inside body 10 plus the force of spring 64, while inner ring 54 will be exposed to the force exerted by line pressure plus the force of spring 62. Also, with the arrangement shown, seat rings 54 and 56 are slidable axially independently of one another. A seal 72 is provided between end fitting 32 and the wall of bore 12 outwardly of extension 44.

In describing the operation of the valve and the seat and seal assemblies incorporated therein, it will be assumed that fluid flow is from right (upstream) to left (downstream) as indicated by the arrows in FIGS. 1 and 2.

With the valve in the open position (FIG. 1) all fluid pressure force will be balanced but seat rings 54 and 56 with their sealing inserts will be urged by the force of the respective springs 62 and 64 into sealing engagement with the annular opposed portion of the surface of closure member 14 surrounding through-bore 16.

When closure member 14 is rotated to the closed position (FIG. 2), several forces are effectively brought into play. Upstream line pressure will enter recess 46 and will act against the rearward end of inner seat ring 54 supplementing the force of spring 62 in thrusting seat ring 54 outwardly of recess 46 to urge sealing insert 58 tightly against the surface of closure member 14 to form one annular seal about closure member 14. At the same time, pressure trapped in bore 12 of the valve body by closing of the valve will act through clearance space 70 against the rearward end of seat ring 56 supplementing the force of spring 64 acting thereon to provide a second annular seal about the closure member.

On the downstream side of the valve, downstream line pressure will act against the rearward end of seat ring 54 supplementing the force of spring 62 acting thereon to provide one seal with the closure member on the downstream side, while the trapped body pressure will act against the rearward end of outer seat ring 56 supplementing the force exerted thereon by spring 64 to provide a second seal with the closure member on its downstream side.

While the forces acting on the downstream seals will usually be less than those acting on the upstream seals, nevertheless, the described arrangement will provide four seals effective to prevent leakage through the valve. Also, because of the symmetrical construction, it will be evident that should a reversal of flow occur in the line, the left hand seat and seal assemblies would automatically function as the upstream seals and the former upstream seals would become the downstream seals but with the same effectiveness.

The sealing functions of the several seals under different conditions will be evident. In the valve closed position, on the upstream side, the forces acting on seal 58 through outer seat ring 54 will be upstream line pressure plus the force of spring 62. On outer seal 60, the forces will be body pressure interiorly of the valve plus the force of spring 64. On the downstream side, the downstream line pressure plus the force of spring 62 will be acting on the inner seal, while body pressure plus the force of spring 64 will be acting on the outer seal. Thus, should the upstream inner seal 58 fail, the resultant increase in body pressure would serve to intensify the sealing forces on both outer seals while the downstream inner seal would be unaffected in that the downstream pressure plus the force of spring 62 would continue to maintain that seal.

Failure of both upstream seals would result in intensified sealing force on the downstream outer seal, while the downstream inner seal would continue to maintain its sealing effectiveness.

Failure of one or both downstream seals would have no effect on the effectiveness of both upstream seals which would continue to function under the differential forces acting thereon.

With the described sealing arrangement, it will be evident that there must be failure of at least three of the four seals before any leakage can occur. The segregation of the inner and outer seals from one another, making them independently and separately responsive to line pressure and body pressure provides the multiple sealing characteristics described.

By employing the described seat and seal assemblies on both sides of the valve, the differential forces opposing movement of the closure member will be minimized, an important consideration particularly in large diameter valves.

FIG. 3 shows the seat and seal assemblies in accordance with this invention applied to a gate valve. In this embodiment, the valve comprises the body 110 defining a gate chamber 112 closed at the bottom by a bottom wall 113 and at the top by a bonnet 130. The sides of body 110 are provided with coaxial openings 115 forming a portion of the flowway through the valve. A gate member 114 is mounted in gate chamber 112 and is of conventional flat-sided shape having a through conduit opening 116 through the lower portion thereof and a closure section 117 adapted to intersect and close off the flowway through the valve. The gate member is reciprocated by means of a stem 120 which extends through bonnet 130, these elements being entirely conventional.

Tubular nozzles or end fittings 132 extend into each of the openings 115 and are provided with radially extending bolt flanges 134 for attaching the fittings to the opposite sides of body 110 by means of cap screws 136. The outer ends of the fittings carry suitable means, such as the bolt flanges 138, for connecting the valve into a pipe line.

Fittings 132 have axial bores 140 coaxial with openings 115 and defining with through conduit opening 116, when the latter is in the valve-open position, the flowway through the valve.

The seat and seal assemblies employed in the illustrative gate valve are identical in all major respects with those previously described, except that in the present embodiment the gate-engaging ends of the seat rings and seals are shaped to cooperate with the flat-sided sealing surfaces of the gate instead of the spherical surface of the ball-shaped closure member of the previously described valve.

As in the previous embodiment, since both assemblies are identical, the description of one will apply to the other. As illustrated, the inner end of end fitting 132 is formed to provide the narrowed annular extension 142 defining the internal and external annular recesses 146 and 148, respectively, bottomed by respective annular shoulders 150 and 152. Inner and outer seat rings 154 and 156, respectively, are slidably mounted in the respective recesses and are provided with the respective sealing inserts 158 and 160 projecting from the forward ends thereof. Biasing springs 162 and 164 are mounted in the related recesses between the outer ends of seat rings and the opposed shoulders 150 and 152.

O-ring seals 166 and 168 are sealingly disposed, respectively, between inner ring 154 and extension 142 and between the latter and outer seat ring 156.

With the arrangement described, it will be seen the valve body pressure will communicate with the rearward end of outer seat ring 156 through the clearance space between the wall of opening 115 and the outer seat ring, while line pressure will enter recess 146 to act on the rearward end of ring 154.

In this embodiment the several seals will function in the same manner as in the case of the ball valve previously described.

FIGS. 4 to 8 are fragmentary views illustrating several examples of modifications of the seat and seal assemblies contemplated by the present invention. They are all illustrated in forms which would be employed for sealing with flat sealing surfaces as in the case of the gate member in FIG. 3. However, it will be understood that in all instances they would be applicable to ball valves by appropriately shaping the closure-engaging ends of the seat rings and their inserts.

For uniformity in description, the same numerals will be applied to the fragments illustrated of the valve body, the end fitting, the inner and outer seat rings and their respective sealing inserts. Where modifications are described suitable identifying numbers will be employed.

In FIG. 4, end fitting 232 having the bore 240 is inserted in bore 212 of body 210 and is formed with a counterbore whereby to define with the wall of bore 212 the adjoining inner and outer annular recesses 246 and 248, respectively, bottomed by the respective end walls or shoulders 250 and 252. Inner and outer seat rings 254 and 256, respectively, carrying respective inserts 258 and 260, are slidably disposed in the respective recesses for slidable engagement with each other. Biasing springs 262 and 264 are disposed in compression between the inner ends of the respective seat rings and the related shoulders. The interior of recess 248 communicates with the interior of the valve body through the annular clearance space between seat ring 256 and bore 212. The bottom of recess 246 is in open communication with bore 240 of the end fitting.

Segregation of the seals from one another, while permitting independent relative axial movement, is effected by providing the seal 268 between seat rings 254 and 256 and a second seal 266 between the inner seat ring 254 and the wall of recess 246 rearwardly of the bottom of recess 248. A third seal 267 will be provided between fitting 232 and the wall of bore 212 to prevent leakage from the valve.

As in the previously described embodiment, it will be seen that inner seat ring 254 and its sealing insert will be responsive to line pressure plus the force of spring 262, and outer seat ring 256 with its sealing insert 260 will be responsive only to body pressure plus the force of spring 264. The sealing functions will be the same as in the previously described embodiments.

In FIG. 5 the seat-ring receiving recesses 246 and 248 are defined by counterboring the inner end of fitting 232 in two steps. The seat rings are disposed in concentric and adjoining relation as in FIG. 4 and slidably sealed off from one another by the spaced seals 266 and 268. A passageway 269 is formed in the end of fitting 232 to provide communication between the interior of the valve body and the bottom of recess 248.

In FIG. 6 both recesses 246 and 248 are enclosed within the inner and outer peripheries of end fitting 232. As a result, communication between bore 240 and the bottom of recess 246 is provided by one or more ports 272 while communication between the interior of the valve body and the bottom of recess 248 is by way of passageway 269.

In FIG. 7 the assembly structure is closely similar to that shown in FIG. 6, except that recesses 246 and 248 are separated from each other by the annular extension 244 necessitating the provision of seals 266 and 270 between both sides of inner seat ring 254 and adjacent walls of recess 246.

FIG. 8 is a slight modification of FIG. 5 in that the recesses 246 and 248 are formed by reducing the external diameter of the inner end of fitting 232 in two steps, outer recess 248 being made deeper than inner recess 246. In this modification as in all others, the sealing arrangements are such that inner seat ring 254 is exposed only to line pressure through port 272, while outer seat ring 256 is exposed only to valve body pressure through the clearance space between seat ring 256 and the wall of bore 212.

Although the preferred embodiments of the present invention contemplate the use of the described seat and seal assemblies on both the upstream and downstream sides of a valve closure, it will be apparent the described seat and seal assembly may be used on only one side of a valve with important advantages over more conventional one-side sealing arrangements. The dual independent seal assembly herein described doubles the sealing effectiveness available in all cases and thus affords increased protection against leakage.

What I claim and desire to secure by Letters Patent is:
1. In a valve including a hollow body, a flowway therethrough having inlet and outlet ends, and a closure member disposed in said body between said ends for movement between positions opening and closing said flowway, a seat and seal assembly for sealing engagement with the closure member, comprising:
 (a) a tubular end fitting extending into at least one of said ends and defining an annular seat face;
 (b) inner and outer concentrically disposed seat rings mounted in said seat face for independent axial movement relative thereto;
 (c) seal means slidably sealing between said rings;
 (d) passage means in said fitting for directing line pressure behind the outer end of said inner seat ring;
 (e) passage means in said fitting for directing valve body pressure behind the outer end of said outer seat ring; and
 (f) resilient means biasing each of said seat rings outwardly of said seat face toward said closure member.

2. In a valve according to claim 1, a seat and seal assembly as described in both said inlet and outlet ends.

3. In a valve according to claim 1, wherein said closure member is ball-shaped.

4. In a valve according to claim 1, wherein said closure member is a flat-sided gate.

5. In a valve according to claim 1, said end fitting having an annular tubular extension defining radially spaced concentric recesses for receiving said seat rings, and said seal means including annular seal rings sealingly disposed between said inner seat ring and said extension and between said outer seat ring and said extension.

6. A valve including:
(a) a hollow body,
(b) a flowway through the body having inlet and outlet ends,
(c) a closure member disposed in said body between said ends for movement between positions opening and closing said flowway; and
(d) a pair of seat and seal assemblies for sealing engagement with the closure member, comprising:
  (i) a tubular end fitting extending into each of said ends and defining an annular seat face;
  (ii) means releasably securing said fittings to said body;
  (iii) inner and outer concentrically disposed seat rings mounted in said seat face for independent axial movement relative thereto;
  (iv) seal means slidably sealing between said rings;
  (v) passage means in said fitting for directing line pressure behind the outer end of said inner seat ring;
  (vi) passage means in said fitting for directing valve body pressure behind the outer end of said outer seat ring; and
  (vii) resilient means biasing each of said seat rings outwardly of said seat face toward said closure member.

7. A valve according to claim 6, wherein said closure member is ball-shaped.

8. A valve according to claim 6, wherein said closure member is a flat-sided gate.

References Cited

UNITED STATES PATENTS 2,893,430　　7/1959　　Holl _____ 251—174 XR

HAROLD W. WEAKLEY, Primary Examiner

U.S. Cl. X.R.

251—174, 317, 328